Fig. 2

INVENTOR:
PO-LUNG LIANG

United States Patent Office 3,213,622
Patented Oct. 26, 1965

1

3,213,622
CONTROL SYSTEM FOR A HYDROKINETIC POWER TRANSMISSION MECHANISM
Po-Lung Liang, Lincoln Park, Mich., assignor to Ford Motor Company, Dearborn, Mich., a corporation of Delaware
Continuation of application Ser. No. 328,713, Dec. 6, 1963. This application Oct. 26, 1964, Ser. No. 407,952
16 Claims. (Cl. 60—54)

This disclosure is a continuation of my pending application S.N. 328,713, filed December 6, 1963, now abandoned.

My invention relates generally to automatic control systems for hydrokinetic power transmission mechanisms, and more particularly to a control system for use with a power transmission mechanism in an automotive vehicle driveline having a hydrokinetic torque converter unit wherein provision is made for obtaining a control pressure signal that is proportional in magnitude to the thrust forces developed by the bladed members of the hydrokinetic unit.

It is known practice to provide a hydrokinetic torque converter unit for use in combination with a multiple speed ratio gear system to establish plural torque delivery paths between a vehicle engine and a driven member. The torque convertor unit comprises a bladed impeller and a bladed stator situated in toroidal fluid flow relationship in a common torus circuit. The bladed stator is situated at a radially inward region of the circuit between the exit flow section of the turbine and the entrance flow section of the impeller. It functions to change the magnitude of the tangential component of the absolute fluid flow velocity vector for the fluid before it enters the bladed region of the impeller thereby making possible a multiplication in the torque that is transmitted by the hydrokinetic unit.

The turbine of the hydrokinetic unit is connected to a power input element of the gear system. Clutch and brake means are provided for controlling the relative motion of the elements of the gear system to provide plural speed ratios. The turbine torque is greater than the engine torque applied to the impeller during operation of the hydrokinetic unit in the torque conversion range.

The magnitude of the torus flow velocity in the hydrokinetic unit is dependent upon the engine torque applied to the impeller and the speed ratio of the torque converter unit. The torus flow creates thrust forces upon the turbine and the stator of the hydrokinetic torque converter unit and the magnitude of these forces depends upon the torque that is transmitted.

The geometry of the blading of the turbine is such that the hydrokinetic fluid flow creates a thrust force that acts upon the turbine in the direction of the impeller as it changes the moment of momentum of the fluid in the torus circuit. The thrust force acting upon the blading of the stator also is in that same direction. As the speed ratio of the hydrokinetic unit approaches the coupling point, the stator beings to freewheel in known fashion and its thrust force becomes zero. Similarly, the thrust acting upon the turbine approaches a minimum value during operation in the coupling range. In contrast, the thrust forces acting upon the stator and the turbine for any given magnitude of the engine torque is a maximum when the speed ratio of the torque converter unit is zero.

It is an object of my invention to make provision for obtaining a pressure signal that is proportional in magnitude to the thrust acting upon the bladed members of the hydrokinetic unit and to utilize that signal to obtain automatic control functions of the power transmission mechanism.

2

It is a further object of my invention to provide a mechanism of the type above set forth wherein the thrust signal can be used to obtain a regulated control pressure that in turn may be utilized by fluid pressure operated clutch and brake servos in the associated gear system.

It is conventional practice to employ a hydrokinetic torque converter unit in combination with a planetary gear system and to control the relative speeds of the elements of the gear system by fluid pressure operated clutch and brake servos. Speed ratio changes in the gear system can be accomplished by distributing pressure selectively to the various servos of the gear system. Pressure distribution is accomplished by means of shift valves that respond to both a driven speed signal and a so-called torque signal or torque demand signal. The speed signal is proportional in magnitude to the speed of the driven member of the mechanism and the torque or torque demand signal is proportional in magnitude to engine intake manifold pressure or to the setting of the carburetor throttle valve in the carburetor system of the engine. The shift valves respond to variations in the two signals to provide speed ratio changes as the driven member accelerates. It is an object of my invention to eliminate the need for the governor signal and the torque or torque demand signal in establishing the various control functions in such an automatic control valve system and to replace them with a single thrust signal that is proportional in magnitude to the thrust forces acting upon the bladed members of the hydrokinetic unit. This thrust signal may be used also to obtain regulation of the control pressure as indicated in the preceding object.

In one embodiment of my invention I have provided a valve system for obtaining a thrust signal that is proportional in magnitude to the thrust forces acting upon the stator. In another embodiment of my invention I have provided a corresponding valve system for obtaining a thrust signal that is proportional in magnitude to the thrust forces acting upon the the turbine. In a third embodiment of my invention I have provided a valve system wherein the combined thrust forces acting upon the turbine and the stator are utilized by the valve system to produce a resultant thrust signal that is proportional in magnitude to the sum of the turbine thrust force and the stator thrust force.

For the purpose of describing my invention more particularly, reference will be made to the accompanying drawings wherein.

Figure 1:
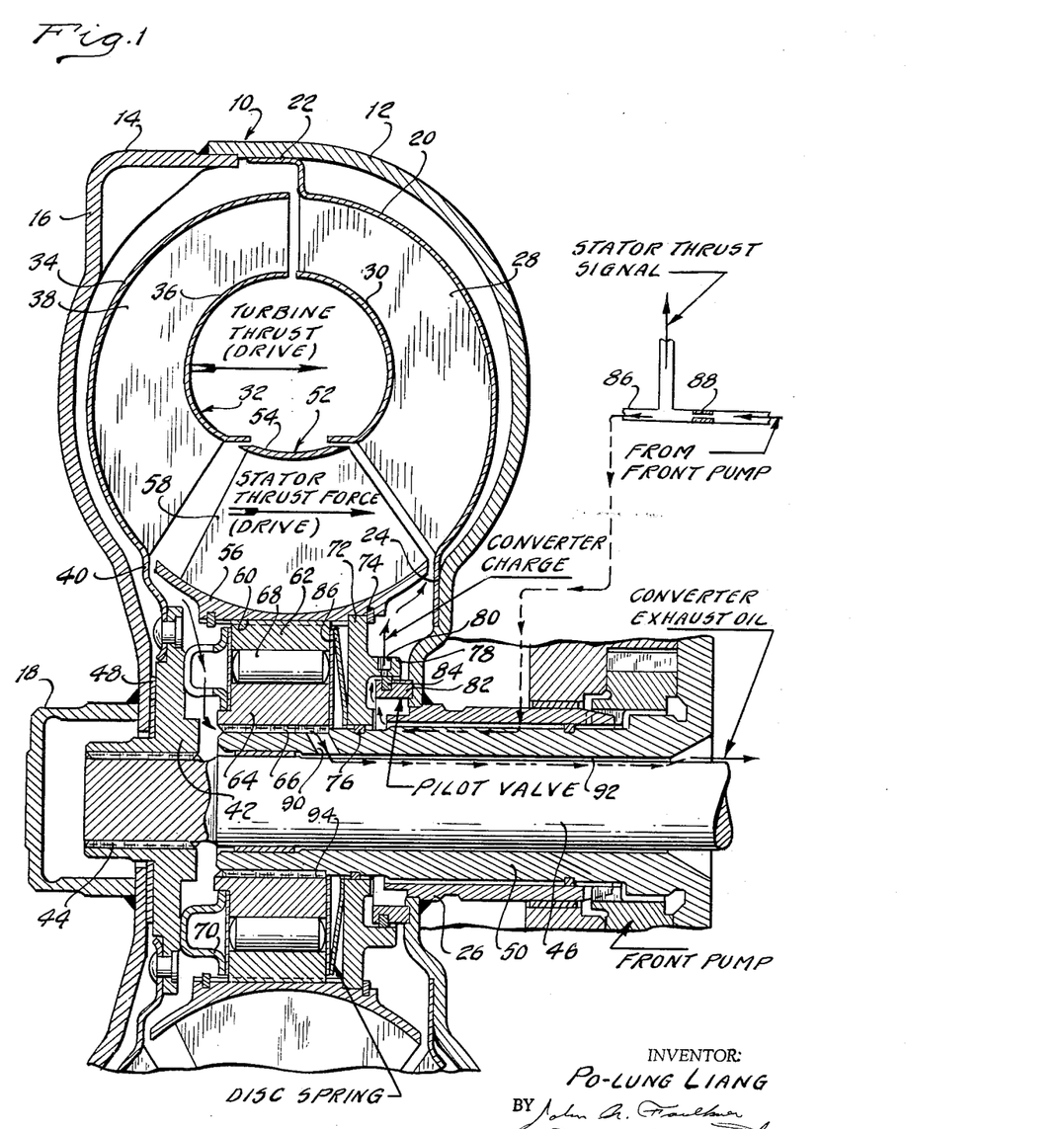
FIGURE 1 shows in cross-sectional form a hydrokinetic torque converter and a valve system for obtaining a thrust signal that is proportional to stator thrust.

Referring first to FIGURE 1, numeral 10 designates an impeller shell for a hydrokinetic torque converter unit. This shell includes a first part 12 and a second part 14 which are welded together at their outer peripheries to provide a unitary shell structure.

Shell part 14 includes a boss 16 which may be bolted or otherwise secured to a drive plate (not shown). The drive plate can be connected in a conventional fashion to the crankshaft of a throttle controlled internal combustion vehicle engine.

The radially inward portion of shell part 14 has secured thereto a pilot hub 18 which may be received within a pilot opening formed in the end of the engine crankshaft.

Shell 12 is formed with a generally toroidal shape. It encloses an outer impeller shroud 20 which may be secured by spot welding at 22 to the interior surface of the shell part 12.

The radially inward part of shroud 20 may be spot welded or otherwise secured to the hub 24 of the shell part 12. Hub 24 is connected also to a sleeve shaft 26 which may be journaled by means of a suitable bushing within a stationary portion of the transmission housing (not shown).

Impeller blades 28 are secured at their outer margins to the interior of the shroud 20. The inner margins of the blades 28 are secured to an inner impeller shroud 30.

A turbine is indicated generally at 32. It includes an outer shroud 34 and an inner shroud 36 with turbine blades 38 situated between them. Blades 38 define radial inflow passages that form continuations of radial outflow passages defined by the impeller blades 28.

The hub 40 of the shroud 34 is riveted or otherwise secured to a turbine hub member 42. This member is splined at 44 to a torque delivery turbine shaft 46. A thrust washer 48 may be situated between the shell parts 16 and the hub member 42.

A stationary stator sleeve shaft 50, which may be connected to the transmission housing, surrounds shaft 46. It provides a bearing support for the shaft 46 and the sleeve shaft 26.

A bladed stator 52 is disposed between the turbine 32 and the impeller. Stator 52 includes a first shroud 54, a second shroud 56 and stator blades 58 situated between the two shrouds. Shroud 56 is formed with a central opening 60 within which is positioned an outer overrunning brake race 62. The race may be held in place by keys or splines as appropriate. An inner overrunning brake race 64 is splined at 66 to the stationary stator shaft 50. Overrunning brake rollers 68 are situated between the races 62 and 64, one of which is cammed, and prevent rotation of the stator 52 in a direction opposite to the direction of rotation of the impeller but permit freewheeling motion of the stator 52 in the direction of rotation of the impeller during operation of the converter unit in the coupling range.

A spacer 70 is situated between the hub member 42 and the races 62 and 64 of the overrunning brake. A valve plate 72 is situated within the shroud 56 and is held axially fast within the opening 60 by means of a snap ring 74 and a cooperating annular shoulder formed in the opening 60. The plate 72 is annular in form and is slidably positioned at its inner periphery upon the stator shaft 50. A suitable fluid seal 76 can be provided between the inner periphery of the plate 72 and the outer surface of the shaft 50.

Plate 72 is formed with a projection 78 which has an orifice 80 formed therein. Projection 78 is annular in form and is telescopically received over a valve member 82. This member is secured to the hub 24 of the shell part 12.

Member 82 is formed with a snap ring groove within which is positioned a snap ring 84. This snap ring registers with orifice 80 and is adapted to restrict progressively the degree of opening of the orifice 80 as the plate 72 is shifted in a right-hand direction.

A Belleville disc spring 86 is positioned between the race 62 and the plate 72. The outer periphery of the disc 86 engages the race 62 and its inner periphery engages the plate 72 and acts to urge normally the plate 72 in a right-hand direction. The outer race 62 of the overrunning brake is adapted to slide axially with respect to the shroud 56 as the valve plate 72 is shifted relative to the shaft 50.

The annular space between sleeve shaft 26 and shaft 50 defines a fluid flow passage that is schematically indicated in FIGURE 1 at 86. This passage is supplied with pressurized fluid from an engine driven positive displacement pump. A flow restricting orifice 88 is disposed in passage 86 to establish an appropriate pressure drop.

The fluid supplied by the engine driven pump passes through passage 86 and then passes radially outwardly through the orifice 80. If the valve plate 72 is shifted in a left-hand direction the orifice 80 is fully opened. The fluid then passes through the space between the shroud 20 and the stator shroud 56 and communicates with the interior of the torus circuit of the converter. The converter is supplied with hydrokinetic fluid in this fashion. Continuous circulation of fluid is maintained as the fluid passes through the space between shroud 34 and shroud 56 and through openings formed in the spacer 70. It then passes through the splines of the splined connection 66 to a flow return port 90 which in turn communicates with the flow return passage 92, the latter being defined by the annular space between shaft 46 and shaft 50.

As the stator thrust force increases, valve plate 72 is urged in a right-hand direction thereby restricting orifice 80. This creates a back pressure in passage 86 and the pressure passage 86 thus can be utilized as a stator thrust signal. Upon a decrease in the engine torque applied to the impeller or a decrease in the torque ratio for any given engine torque, the stator thrust force will decrease. This, of course, will cause a decrease in the degree of restriction in the orifice 80. This in turn results in a decrease in the pressure in passage 86.

The signal that is obtained is proportional in magnitude to the magnitude of the stator thrust force which in turn is determined by torque ratio and engine torque. The thrust acting upon the turbine 32 does not contribute to the magnitude of the thrust signal since the axial forces acting upon the turbine 32 are grounded through the inner race 64 of the overrunning brake. This race in turn is anchored against an annular shoulder 94 formed on the shaft 50.

Figure 2:
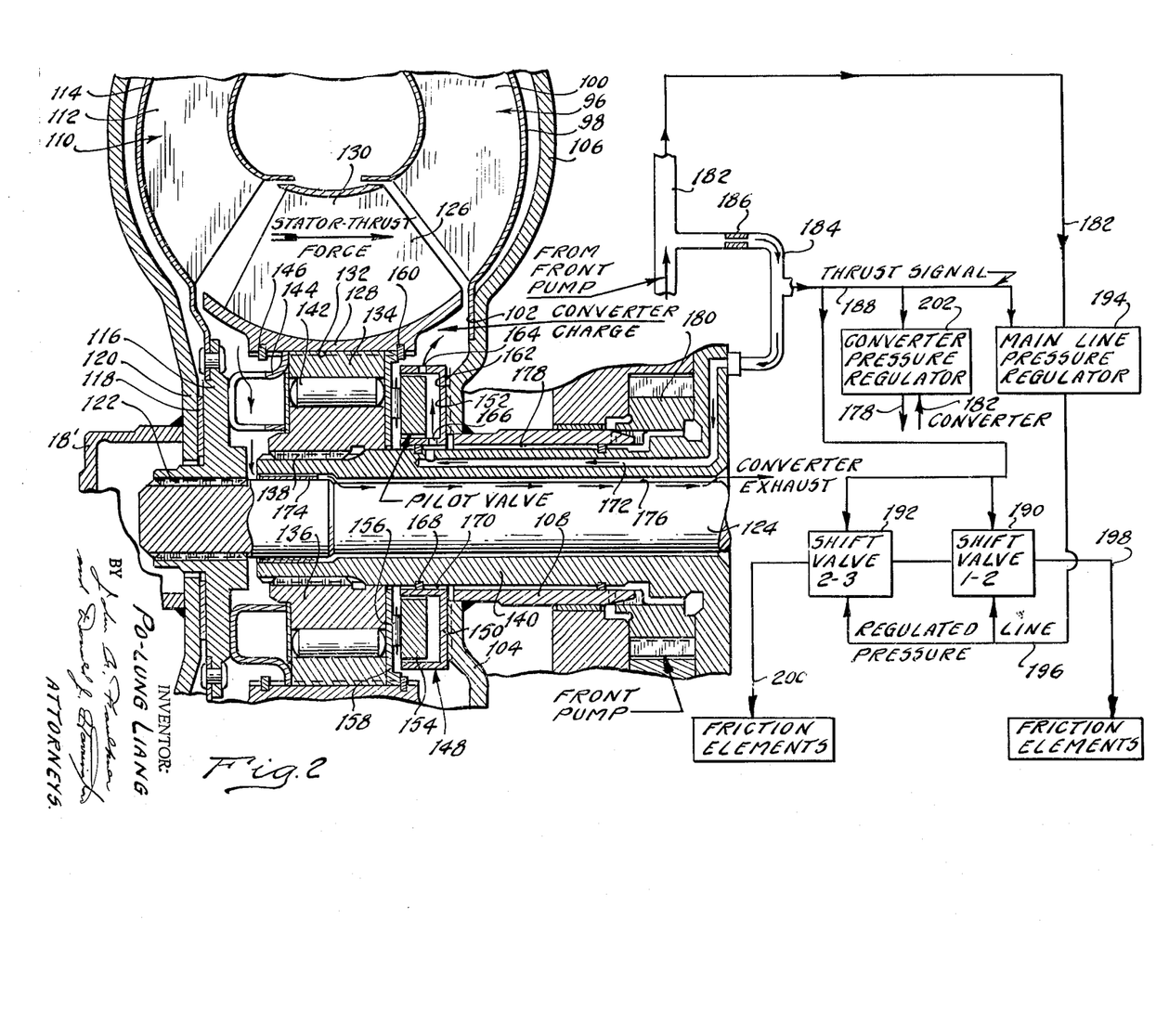
FIGURE 2 is a partial cross-sectional view of a torque converted and a schematic illustration of a valve system wherein provision is made for obtaining a thrust signal that is proportional in magnitude to the combined turbine and stator thrust forces.

Referring next to FIGURE 2, I have illustrated an alternate arrangement for producing a converter thrust signal that is sensitive to both turbine thrust and stator thrust. In this instance the torque converter impeller is designated by reference character 96. It may be connected to the vehicle engine as described previously and it includes an outer shroud 98 to which impeller blades 100 are attached. Shroud 98 is formed with a hub 102 which is welded or otherwise secured to the hub portion 104 of an impeller shell 106. Hub portion 104 is welded to a sleeve shaft 108 which may be journaled in a relative stationary transmission housing (not shown).

A turbine, shown at 110, includes turbine blades 112 which are secured to an outer turbine shroud 114. The hub of shroud 114 is riveted or otherwise secured to a turbine hub member 116. A thrust washer 118 can be situated between the member 116 and the hub 120 of the impeller shell. Member 116 is splined at 122 to a central turbine shaft 124.

A bladed stator 126 includes a stator shroud 128 and stator blades 130. These blades are located between the flow exit section of turbine blades 112 and the flow entrance section of the impeller blades 100 and are adapted to change the tangential component of the absolute fluid flow velocity vector during operation of the converter unit in the torque conversion range.

Shroud 128 is formed with a central opening 132 within which is slidably splined an overrunning brake race 134. An overrunning brake inner race 136 is splined at 138 to a relatively stationary sleeve shaft 140. Overrunning brake rollers 142 are situated between the races 134 and 136. One of these races can be cammed so that the rollers 142 will prevent rotation of the stator 126 in a direction opposite to the direction of rotation of the impeller during operation in the torque range, but which will permit freewheeling motion of the stator 126 in the direction of rotation of the impeller during operation in the converter coupling range. The spacer 144 is situated between hub member 116 and the races 134 and 136. Axial movement of the race 134 is limited by a snap ring 146 located within the opening 132.

A pilot valve generally indicated at 148 includes a cage 150 which defines an annular cylinder 152. Slidably situated within the cylinder 152 is a piston in the form of an annular valve ring or plate 154. A radial needle bearing assembly 156 is situated between the valve plate 154 and a thrust plate 158 located on the right-hand side of the races 134 and 136. Snap ring 160 limits axial movement of the plate 158 with respect to the shroud 128.

Hub 104 engages the cage 150. Hub 104 can be grooved radially, as indicated at 162, to provide radial fluid flow passages.

The radially outward portion of cage 150 is formed with orifices 164 and the radially inward portion thereof is formed with ports 166. Ports 164 and 166 are axially spaced somewhat relative to each other. Ports 166 are sealed by means of sealing rings 168 and 170 which surround shaft 140.

Fluid flow passage 172 is formed in shaft 140 and communicates with ports 166. Fluid then is allowed to pass through ports 166 to the interior of the cylinder 152. It is exhausted from the cylinder 152 through ports 164. This fluid acts as converter charge fluid and passes into the region of the torus circuit of the converter unit through the space between the shroud 128 and the shroud 98. After the fluid circulates through the torus circuit, it is returned through the space between shroud 128 and shroud 114. It passes then through apertures formed in spacer 144 and through axial passages formed in bearing 174. The fluid then returns through an annular passage defined by the space between shaft 140 and shaft 124. This space is indicated at 176.

The converter charge flow is supplemented by a separate converter charge flow passage 178 that is defined by the annular space between sleeve shaft 108 and shaft 140. This passage communicates with radial grooves 162 and delivers converter charge fluid to the interior of the torus circuit. This same fluid returns through the converter flow return circuit defined in part by passage 176.

During operation of the converter in the torque converter range turbine thrust will act upon the turbine 110 to urge it in a right-hand direction. Similarly stator thrust will act upon the stator 126 to urge it in a right-hand direction. The thrust of the turbine is transferred directly through the spacer 144 to the races 134 and 136 and hence through the thrust plate 158 and the radial needle bearing assembly 156 to the valve plate 154. This thrust is supplemented by the thrust that acts upon the stator 126. The combined thrust of the turbine and the stator causes the valve plate 154 to restrict progressively the ports 164. As the thrust increases, the restriction increases and this is accompanied by a pressure build-up in passage 172. The magnitude of the pressure developed in passage 172 thus is an indication of the combined thrust of the turbine and the stator, which in turn is an indication of the torque ratio and engine torque.

Inner race 136 is adapted to slide upon the splined connection 138 and race 134 is adapted to slide similarly with respect to the shroud 128.

In FIGURE 2, numeral 180 schematically designates an engine driven positive displacement pump. Its discharge side communicates directly with passage 182 which supplies passage 184. Passage 172 communicates with passage 184 as indicated. A flow restricting orifice 186 is located in passage 184 thereby creating a pressure drop that will cause control pressure to be maintained in the passage 182 regardless of the condition of the pilot valve 148.

The pressure signal made available to passage 172 and hence to passage 184 is distributed to passage 188 which in turn is in fluid communication with a one-two shift valve 190 and a two-three shift valve 192. Passage 182 may communicate with a main pressure regulator valve 194. This valve 194 responds to the thrust signal made available to it by passage 188 to regulate line pressure at a value that is dependent upon engine torque or engine torque ratio for any given engine torque. This regulated line pressure is distributed from regulator valve 194 through passage 196 to both the one-two shift valve 190 and the two-three shift valve 192. The shift valves 190 and 192 respond to variations in the thrust signal in passage 198 to interrupt or establish communication between passage 196 and the various servos for the clutch and brake friction elements. Valve 190 establishes selectively communication between passage 196 and passage 198, the latter communicating with the high speed ratio servos in the gear system. Similarly, valve 192 establishes selectively communication between passage 196 and passage 200, the latter communicating with the servos for the low speed friction elements of the gear system.

A converter pressure regulator valve can be employed for regulating the magnitude of the charge pressure made available to the torquet converter unit. Such a valve is indicated at 202. It responds to the pressure signal delivered to it by passage 188 to regulate the pressure in passage 178. For this purpose the regulator valve 202 can communicate with passage 182 on its intake side and it may communicate with passage 178 on its exit side. This arrangement is schematically illustrated in FIGURE 2.

Figure 3:
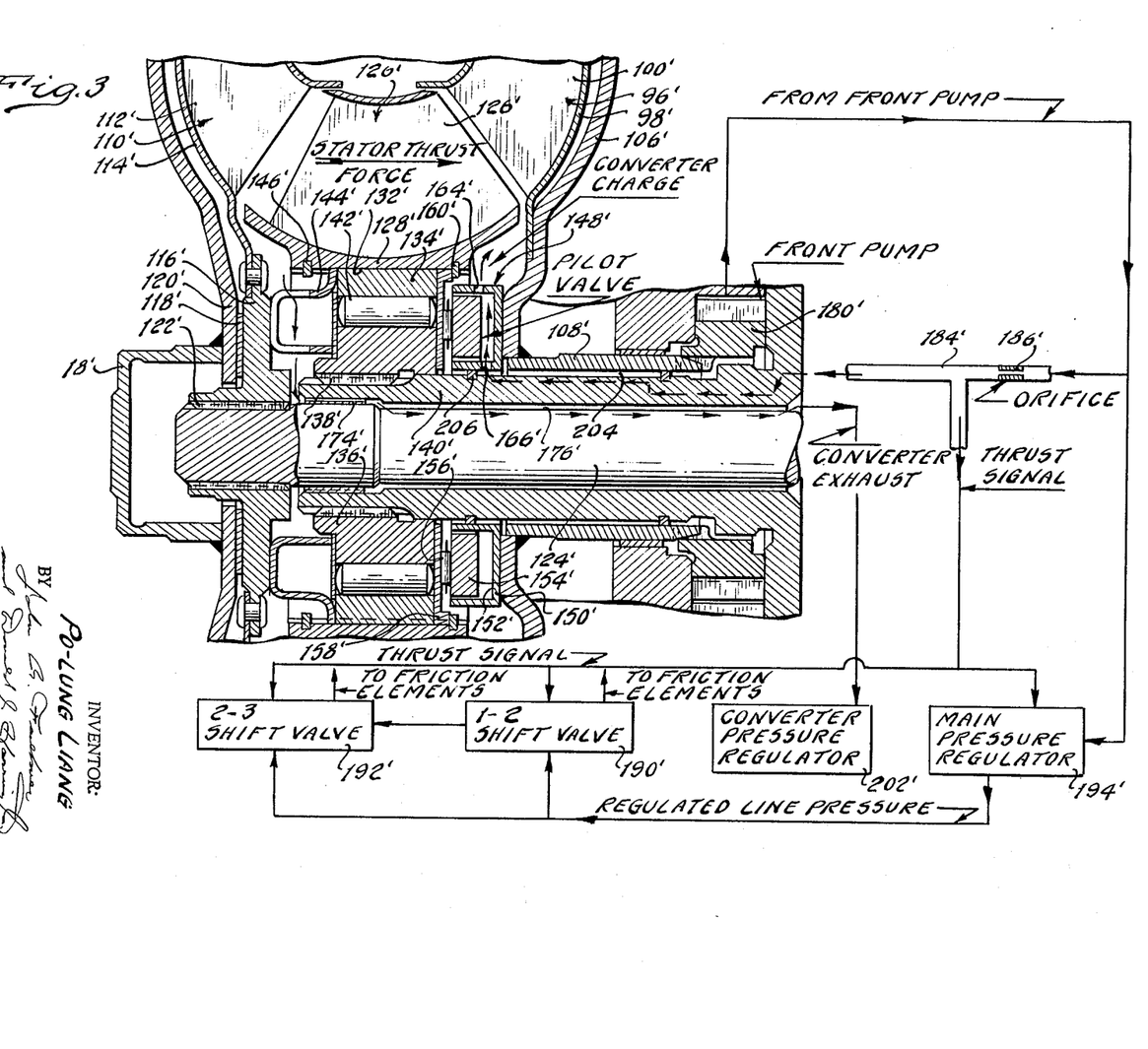
FIGURE 3 is a view similar to FIGURE 2 although it shows an alternate fluid flow path for directing hydrokinetic fluid through a torus cavity of the converter.

In FIGURE 3 I have illustrated an alternate arrangement for supplying fluid to the torus circuit of the converter unit and returning it to the low pressure converter flow passages. This arrangement includes a pilot valve mechanism that may be substantially identical to the pilot valve described particularly with reference to FIGURE 2. For purposes of simplicity, the elements of FIGURE 3 that correspond to elements in the structure of FIGURE 2 have been indicated by similar reference characters, although primed notations have been added.

The stator sleeve shaft 140' in FIGURE 3 cooperates with the shaft 108' to define a fluid feed passage 204. A single sealing ring 206 surrounds shaft 108' and seals the ports 166' of the pilot valve 148'. The converter charge fluid is exhausted through the annular space between shaft 124' and stator sleeve shaft 140' as in the embodiment of FIGURE 2.

The signal produced in passage 204 corresponds to the signal that is created in passage 172 in the embodiment of FIGURE 2. This signal in turn is distributed, as previously described, to the main pressure regulator valve, the converter regulator valve, the one-two shift valve and the two-three shift valve to establish the various control functions.

In the embodiment of FIGURE 3, the flow in passage 204 forms also the converter charge flow. As the combined thrust of the turbine and stator increases, the ports 164' of the pilot valve 148' become progressively restricted and the magnitude of the flow made available to the converter thus is decreased. Under some circumstances, it may be possible for the converter fluid to become over-heated because of the fact that the converter charge flow is reduced at a time when the torque or the torque ratio is the highest. This difficulty is overcome, however, by using the arrangement of FIGURE 2 since the converter charge flow then may be maintained at a high value regardless of the degree of restriction provided by the pilot valve. The converter charge flow is made available to the torus circuit of the converter through a parallel feed passage in the embodiment of FIGURE 2.

Figure 4:
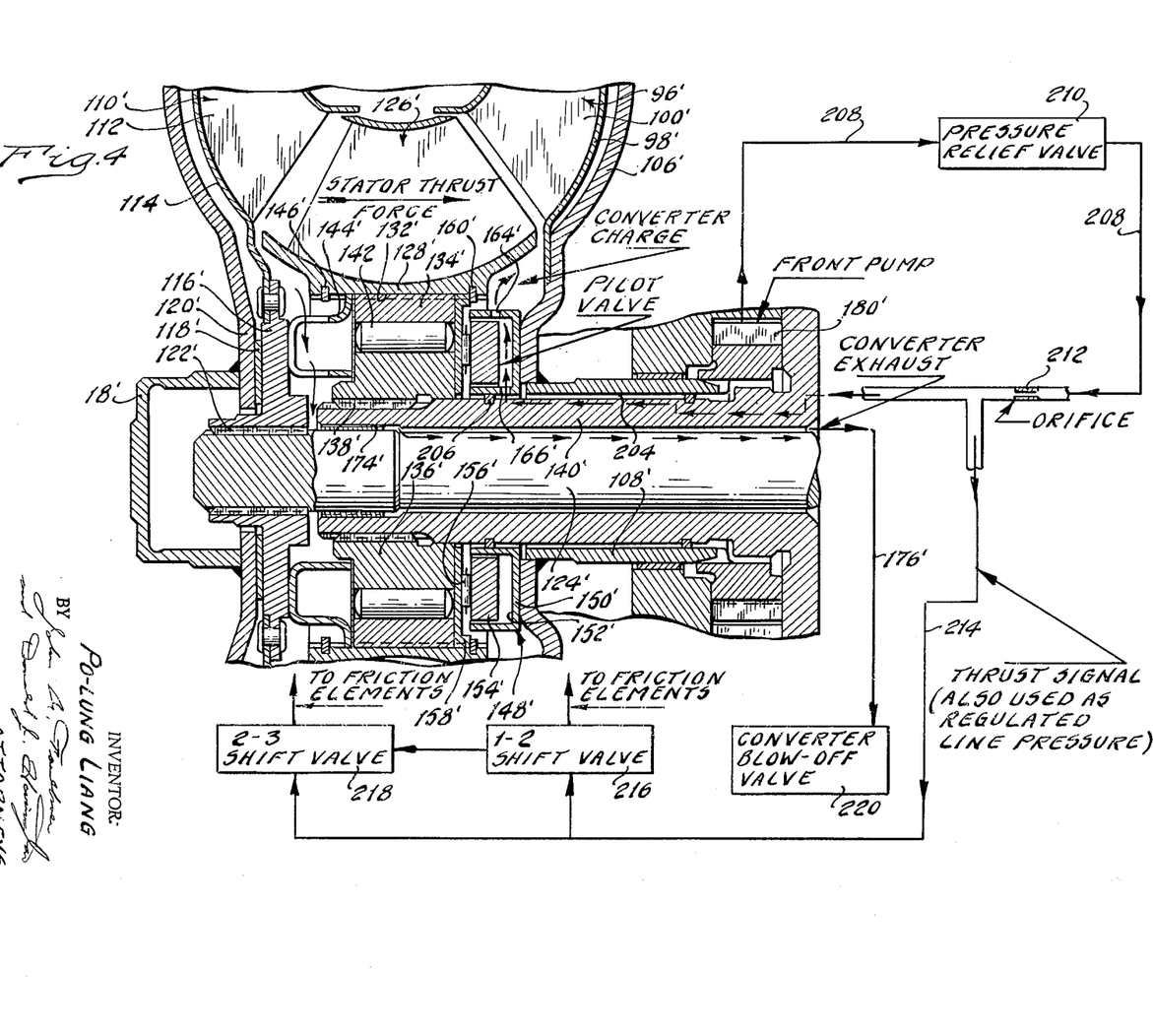
FIGURE 4 is a view similar to FIGURE 2 although it utilizes a modified valve system.

In FIGURE 4, we have illustrated an alternate circuit that may be used in lieu of the circuit shown in FIGURES 2 and 3. For purposes of illustration, we have shown the valve arrangement of FIGURE 4 with the torque converter structure of FIGURE 3. For this reason, identical symbols have been used to designate the various parts of the converter units of FIGURES 3 and 4. In the arrangement of FIGURE 4, however, the engine driven pump 180′ delivers its pressurized fluid through a passage 208 and through a simple pressure relief valve 210. The pressure of the pump 180 then is passed through an orifice 212 located in passage 208. The downstream side of the orifice 212 communicates with the passage 204 to provide a converter feed flow as well as a flow which enables the pilot valve to function.

The back pressure developed in passage 204 by the pilot valve in response to the thrust force acting upon the turbine and the stator is distributed to a line pressure passage 214. This passage communicates with a one-two shift valve 216 and a two-three shift valve 218. Each valve can function in response to changes in regulated line pressure selectively to establish and interrupt communication with fluid pressure operated servos associated with the various friction elements of the gear system. Speed ratio changes in the gear system can be accomplished in this fashion. Thus the regulated line pressure acts as its own pressure signal.

Converter pressure can be maintained at a regulated safe value by means of a simple converter blow-off or check valve 220 located in passage 176′.

Figure 5:
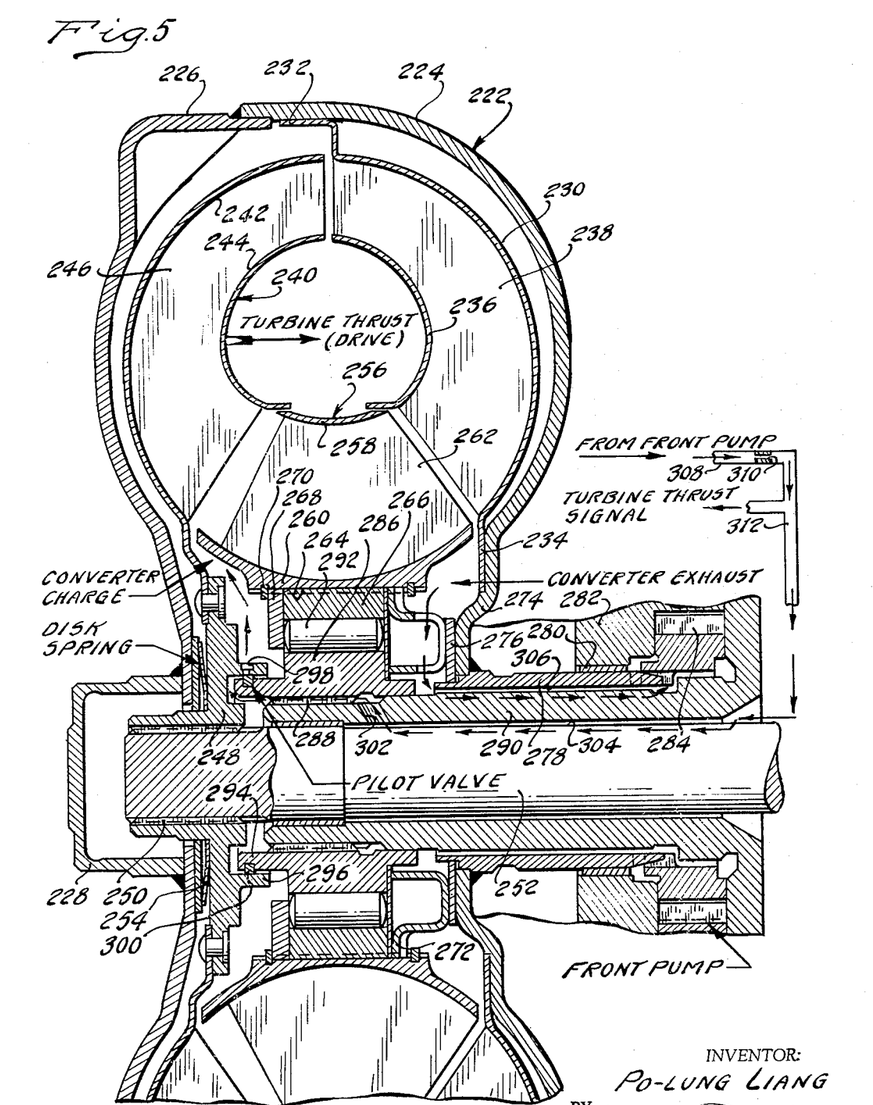
FIGURE 5 shows a torque converter unit in cross-section together with a valve arrangement for obtaining a thrust signal that is proportional in magnitude to the turbine thrust without reference to stator thrust.

In the embodiments of FIGURES 2, 3 and 4, the thrust signal is proportional to the sum of the thrust forces acting upon the turbine and the stator. In the arrangement of FIGURE 5, however, we have provided a valve system that is capable of establishing a thrust signal that is proportional only to the thrust forces acting upon the turbine. This structure of FIGURE 5 includes a hydrokinetic torque converter unit 222 having an impeller shell part 224 with a generally toroidal shape. It is welded at its outer periphery to a second shell part 226 which may be bolted or otherwise secured to the crankshaft of an internal combustion engine.

A hub 228 is secured to the radially inward portion of shell part 226. It may be piloted within a suitable pilot recess formed in the end of the crankshaft.

An outer turbine shroud 230 is spot welded at its outer periphery 232 to the interior of the shell part 224. It is spot welded at its inner periphery 234 to the hub of shell part 224.

An inner impeller shroud is shown at 236. Radial outflow impeller blades 238 are disposed between the shrouds 230 and 236. These blades define flow passages that are in fluid communication with flow passages defined by turbine 240. Turbine 240 includes an outer shroud 242, an inner shroud 244 and blades 246 which define radial inflow passages. Shroud 242 is secured by rivets or any other suitable means to a turbine hub member 248. This member is splined at 250 to a turbine shaft 252. A Belleville disc spring 254 is situated between member 248 and the radially inward portion of shell part 226. It acts to urge normally the member 248 in a right-hand direction.

Situated between the flow exit region of the turbine 240 and the flow entrance region of the impeller blades 238 is a bladed stator 256. This stator includes a shroud 258, a shroud 260 and stator blades 262 located between the shrouds.

A central opening 264 is formed in the shroud 260. It is internally splined or keyed to receive an overrunning brake outer race 266. This race can be held axially fast by a retainer ring 268 and by an associated snap ring 270 located within the opening 264. A spacer 272 is located between race 266 and the hub 274 of the shell part 224. A suitable thrust washer 276 can be provided at this location.

Hub 274 is connected by welding to a sleeve shaft 278 journaled by means of bushing 280 within the transmission housing shown in part at 282. Shaft 278 can be connected mechanically to one gear element 284 of a positive displacement pump assembly that corresponds to the pumps 180 and 180′ of the previous embodiments.

An overrunning brake inner race 286 is splined at 288 to a stationary stator sleeve shaft 290. This shaft can be connected to the transmission housing in the usual fashion. One of the races 266 or 286 can be cammed to provide cooperation with clutch rollers 292 located between the races. Rollers 292 permit free-wheeling motion of the stator 256 in the direction of rotation of the impeller during operation of the converter unit in the coupling range. Relative rotation in the opposite direction, however, is inhibited.

Race 286 is formed with a projection 294. This projection is received telescopically within an annular ring 296 carried by the hub member 248. This member 248 is formed with one or more orifices 298. Projection 294 is formed with a sealing ring groove within which is situated a sealing ring 300 which registers with the orifices 298. The disc spring 254 normally urges the hub member 248 over the sealing ring 300 to restrict orifices 298.

Orifices 298 form in part a converter feed passage. They communicate with a port 302 formed in the stator sleeve shaft 290. This port 302 in turn communicates with an annular passage defined by the space between shafts 290 and 252. This space is identified by reference character 304. The splined connection 288 allows fluid to pass therethrough, between orifices 298 and port 302.

The converter fluid that is fed to the torus circuit from the passage 304 passes through the space between shroud 260 and turbine shroud 242. It then circulates in the circuit and is returned through the space between shroud 260 and the shroud 230. It then passes radially inwardly past the spacer 272 and hence through the annular passage defined by the space between shaft 278 and shaft 290. This space is identified in FIGURE 5 by reference character 306.

The engine driven pump shown in part at 284 communicates with a line pressure passage 308. It delivers pressure through an orifice 310 to the passage 312. The latter in turn communicates with the passage 304. As the thrust acting upon the turbine increases, hub member 248 will be shifted in a right-hand direction thereby tending to restrict the degree of opening of the orifices 298. This creates a back pressure in passage 312 on the downstream side of the restriction 310. This back pressure can be utilized in the manner previously described as a turbine thrust signal.

The spring 254 is useful during coasting operation to urge the member 248 in a right-hand direction against the opposing influence of the thrust forces developed during coasting. These forces act in a left-hand direction rather than in a right-hand direction as during normal torque delivery operation. The member 248 and the extension 294 cooperate to define a pilot valve that is similar in function to the pilot valve described with reference to the previous embodiments.

Figure 6:
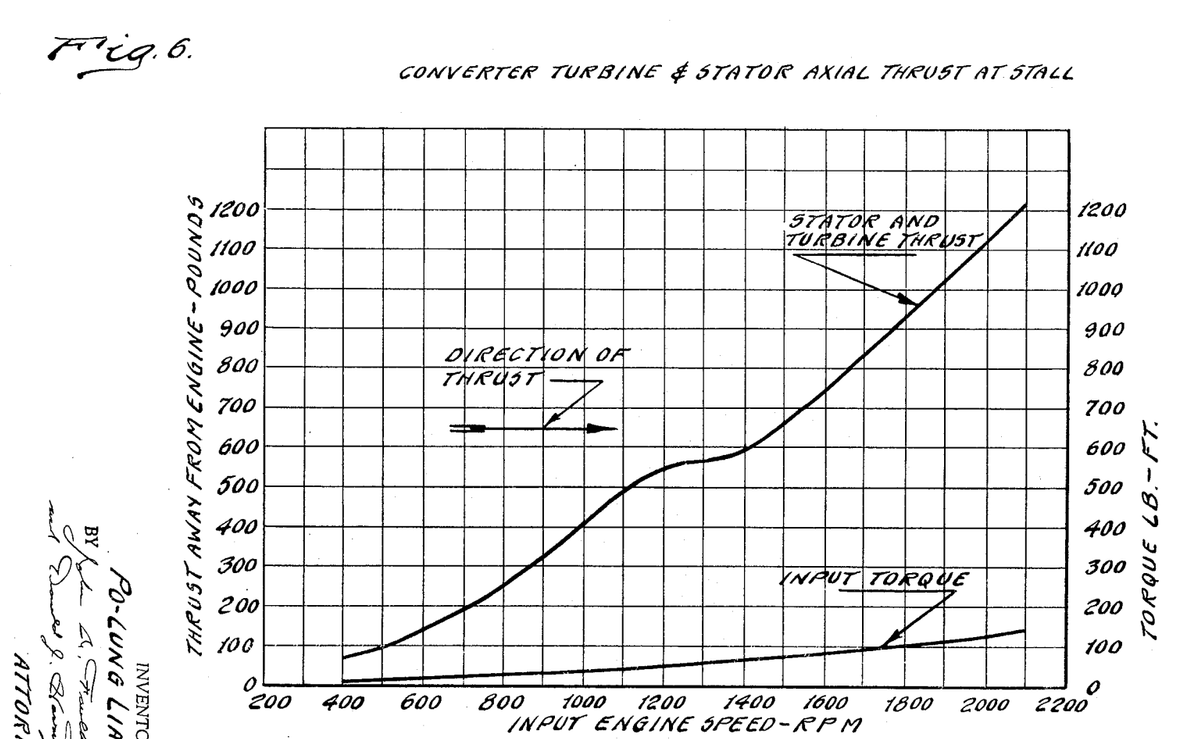
FIGURE 6 is a chart showing the variations in stator thrust and turbine thrust as the engine speed is increased when the turbine remains stalled.
Figure 7:
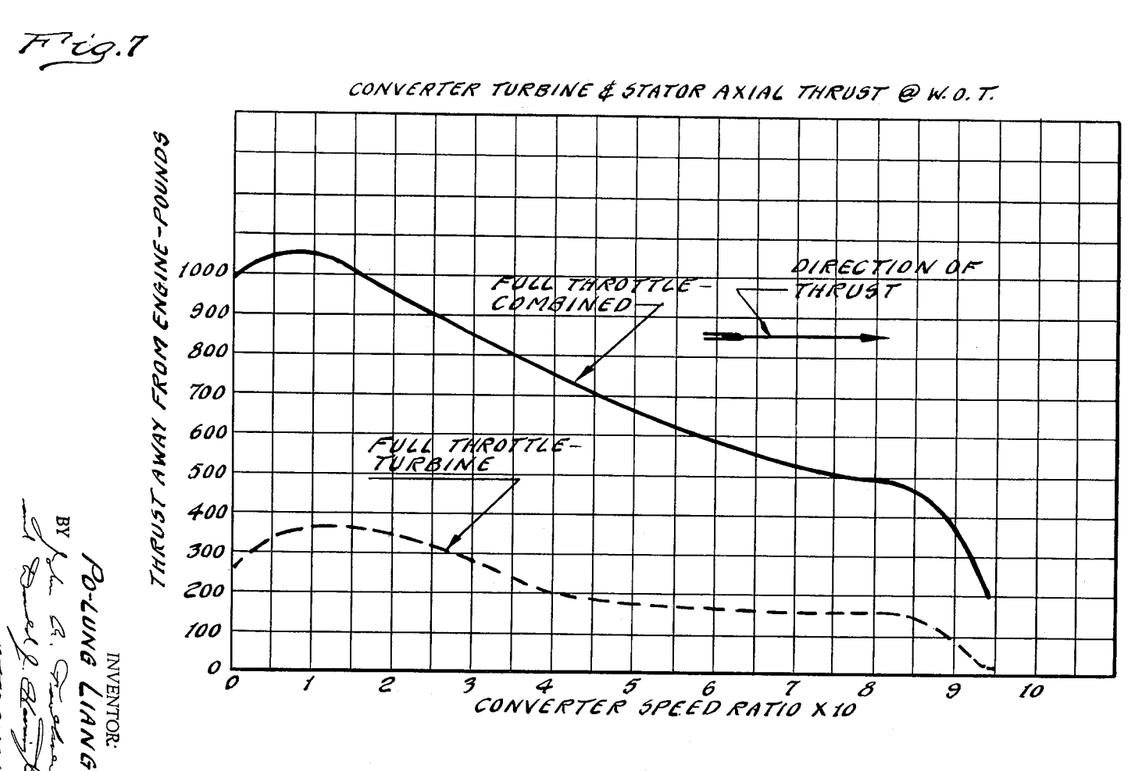
FIGURE 7 is a chart showing the variation in turbine thrust and the combined thrust of the turbine and the stator as the converter speed ratio is changed with the engine operating at wide open throttle.

In FIGURE 6 I have illustrated a chart that shows the variation in the total thrust due to the turbine and stator thrust forces as engine speed changes with the turbine stalled. The thrust forces change, however, if the torque ratio of the converter unit is caused to vary for any given engine throttle setting. To illustrate this characteristic, we have shown in FIGURE 7 the variation in the thrust forces of the turbine and the stator for full engine throttle operation as the converter speed ratio is allowed to vary. The full line curve shown in FIGURE 7 illustrates the combined thrust of the turbine and the stator while the dash line shown in FIGURE 7 shows the turbine thrust acting alone. A corresponding curve, of course, would be obtained for any other engine throttle setting.

During operation of the torque converter, the thrust that acts upon the turbine is directed in the direction of the arrow shown, for example, in FIGURES 1 and 5. This thrust acting in a right-hand direction is not due entirely to the force of the centrifugal pressure in the region between the impeller shell or casing 16 and the turbine outer shroud 34. The right-hand thrust acting upon the turbine is created by the hydrokinetic reaction of the fluid on the blading of the turbine as the moment of momentum of the fluid decreases upon movement of the fluid from the radially outward flow inlet section to the radially inward flow outlet section. This characteristic is true of any conventional torque converter of the type used commercially in automotive vehicle drivelines.

If a straight line were to be drawn from any particle of fluid as it passes through the toroidal fluid flow passage of the turbine to a point on the turbine blade, and if that straight line were to be made perpendicular to the plane of the turbine blade, the line would extend generally in a right-hand direction. Although it would not extend in a direction parallel to the axis of the converter, any straight line drawn from that particle of fluid in a direction perpendicular to the blade would have a component extending in a right-hand axial direction. It is due to this characteristic that the thrust acting upon a turbine blade in a torque converter of this type will always be in a right-hand direction.

The amount of this thrust will be at a maximum when the speed ratio is a minimum and will be minimum when the speed ratio is the maximum. This is due to the fact that the toroidal fluid flow decreases as the speed ratio increases.

In general, the thrust acting upon the impeller is in a direction opposite to the direction of the combined thrust of the turbine and the reactor. It tends to balance the combined thrust of the turbine and reactor as illustrated in the chart of FIGURE 9.

Reference may be made to an article published by V. J. Jandasek, entitled "Single-Stage Three-Element Torque Converter," which appears in volume I of the SAE publication entitled "Passenger Car Automatic Transmissions," copyright, 1962. Pages 167 and 168 discuss the subject of thrust loads in a conventional three-element torque converter of the type with which this disclosure is concerned.

Figure 8:
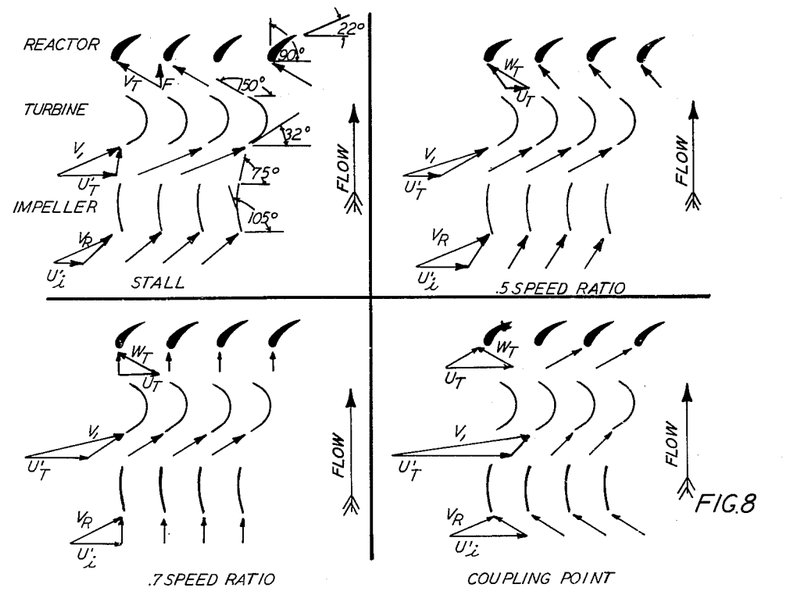
FIGURE 8 shows a flow vector diagram for the blading of a typical three-element torque converter embodying the features of my invention.

As observed from FIGURE 8, the angularity of the exit sections of the turbine blading is such that the hydrokinetic thrust reaction forces will be in the direction of the impeller. Of course, a different condition might exist if the moment of momentum of the fluid were to increase as it traverses in a radially inward direction through the bladed passages of the turbine. But since that is not the case, and since in an arrangement of this type the moment of momentum always decreases during drive under torque, the hydrokinetic thrust reaction will be toward the impeller because of the angularity of the blade exit sections and the right-hand axial component of the normal hydrokinetic reaction forces acting upon the surface of the blading.

Figure 9:
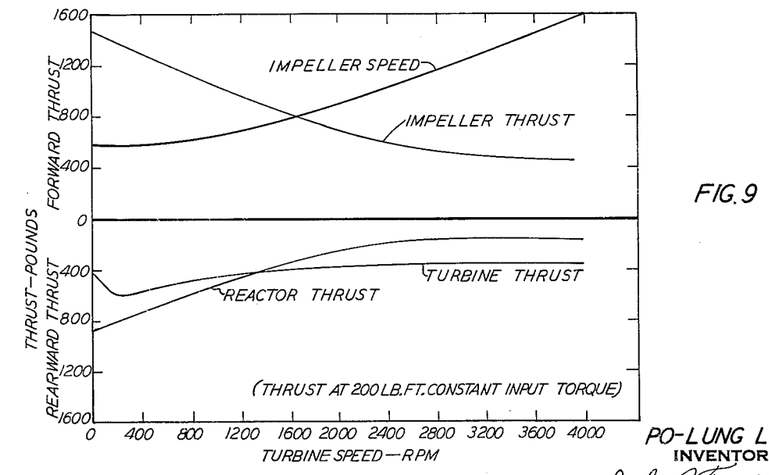
FIGURE 9 shows in graphical form the variation in thrust forces on the impeller of the turbine and the reactor for a typical three-element torque converter as the speed of the turbine is increased for any given constant engine torque.

As observed from FIGURE 9, the direction of the turbine thrust always is in the same direction as the reactor stator thrust.

Having thus described preferred embodiments of my invention, what I claim and desire to secure by U.S. Letters Patent is:

1. In an automatic power transmission mechanism having a hydrokinetic torque converter and a control valve system, said torque converter comprising an impeller member, a turbine member and a stator member situated in toroidal fluid flow relationship in a common torus circuit, said impeller member being adapted to be connected to an engine, said turbine member being adapted to be connected to a driven member, a fluid pressure source, converter feed passage means for delivering fluid from said source to said converter, converter flow return passage means for returning fluid flow from said converter to a low pressure region, pilot valve means disposed in and partly defining said converter feed passage means including relatively movable valve parts respectively connected to separate members of said torque converter, said valve parts being subjected to axial thrust forces acting upon at least one of said members to vary the degree of restriction to fluid flow in said feed passage means as the axial thrust forces acting upon said one of said members change, thereby creating a thrust pressure signal that may be utilized by said control system to initiate control responses.

2. In a hydrokinetic power transmission mechanism for delivering power from an engine to a driven member, a bladed impeller member, a bladed turbine member and a bladed stator member situated in toroidal fluid flow relationship in a common torus circuit, said impeller member being adapted to be connected to said engine, means for connecting said turbine member to said driven member, a pressure source, fluid flow feed passage means for delivering hydrokinetic fluid from said source to said circuit, converter fluid return passage means extending from said circuit to a low pressure region, pilot valve means disposed in and partly defining said feed passage means and including a first valve member, means for holding said first valve member axially fast, a second valve member disposed in registry with respect to said first valve member, means for mechanically transferring axial thrust forces from said stator member to said second valve member, thereby providing a fluid flow restriction in said feed passage means that establishes a back pressure that is related in magnitude to said axial thrust forces, and means for delivering said back pressure to pressure sensitive portions of said mechanism.

3. In a hydrokinetic power transmission mechanism for delivering power from an engine to a driven member, a bladed impeller member, a bladed turbine member and a bladed stator member situated in toroidal fluid flow relationship in a common torus circuit, said impeller member being adapted to be connected to said engine, means for connecting said turbine member to said driven member, a fluid pressure source, fluid flow feed passage means for delivering hydrokinetic fluid from said source to said circuit, converter fluid return passage means extending from said circuit to a low pressure region, pilot valve means disposed in and partly defining said feed passage means and including a first valve member, means for holding said first valve member axially fast, a second valve member disposed slidably with respect to said first valve member, means for mechanically transferring axial thrust forces from said stator member to said second valve member, thereby providing a fluid flow restriction in said feed passage means, means for delivering said back pressure to pressure sensitive control portions of said mechanism and means for transferring axial thrust forces acting upon said turbine member to said stator member whereby said second valve member is shifted relative to said first valve member in response to the combined axial thrust forces of said turbine member and said stator member.

4. In a hydrokinetic power transmission mechanism for delivering power from an engine to a driven member, a bladed impeller member, a bladed turbine member and a bladed stator member situated in toroidal fluid flow relationship in a common torus circuit, said impeller member being adapted to be connected to said engine, means for connecting said turbine member to said driven member, a fluid pressure source, fluid flow feed passage means for delivering hydrokinetic fluid from said source to said circuit, converter fluid return passage means extending from said circuit to a low pressure region, pilot valve means disposed in and partly defining said feed passage means for providing a fluid flow restriction in said feed passage that establishes a back pressure that is related in magnitude to axial thrust forces on said stator member, means for delivering said back pressure to pressure sensitive portions of said mechanism, said pilot valve means comprising an annular cylinder situated between portions of said impeller member and said stator member, an orifice formed in said cylinder, an annular valve ring situated in said cylinder and cooperating therewith to define a pressure chamber, and means for transferring axial thrust forces from said stator member to said ring, said chamber being in fluid communication with said feed passage means, said ring restricting said orifice in response to an increase in the axial thrust forces acting upon said stator member.

5. In a hydrokinetic power transmission mechanism for delivering power from an engine to a driven member, a bladed impeller member, a bladed turbine member and a bladed stator member situated in toroidal fluid flow relationship in a common torus circuit, said impeller member being adapted to be connected to said engine, means for connecting said turbine member to said driven member, a fluid pressure source, fluid flow feed passage means for delivering hydrokinetic fluid from said source to said circuit, converter fluid return passage means extending from said circuit to a low pressure region, pilot valve means disposed in and partly defining said feed passage means for providing a fluid flow restriction in said feed passage means that establishes a back pressure, means for delivering said back pressure to pressure sensitive portions of said mechanism, said pilot valve means comprising an annular cylinder situated between portions of said impeller member and said stator member, an orifice formed in said cylinder member, an annular valve ring situated in said cylinder and cooperating therewith to define a pressure chamber, means for transferring axial thrust forces from said stator member to said ring, said chamber being in fluid communication with said feed passage means, said ring restricting said orifice in response to an increase in the axial thrust forces acting upon said stator member, and means for transferring axial thrust forces acting upon said turbine member to said stator member, whereby said ring is shifted relative to said cylinder in response to the combined axial thrust forces of said turbine member and said stator member.

6. In a hydrokinetic power transmission mechanism for delivering power from an engine to a driven member, a bladed impeller member, a bladed turbine member and a bladed stator member situated in toroidal fluid flow relationship in a common torus circuit, said impeller member being adapted to be connected to said engine, means for connecting said turbine member to said driven member, a fluid pressure source, fluid flow feed passage means for delivering hydrokinetic fluid from said source to said circuit, converter fluid return passage means extending from said circuit to a low pressure region, pilot valve means disposed in and partly defining said feed passage means and including a first valve member held axially fast, a second valve member disposed in registry with respect to said first valve member, means for mechanically transferring axial thrust forces from said turbine member to said second valve member, thereby providing a fluid flow restriction in said feed passage means that establishes a back pressure that is related in magnitude to said axial thrust forces, and means for delivering said back pressure to pressure sensitive portions of said mechanism.

7. In a hydrokinetic power transmission mechanism for delivering power from an engine to a driven member, a bladed impeller member, a bladed turbine member and a bladed stator member situated in toroidal fluid flow relationship in a common torus circuit, said impeller member being adapted to be connected to said engine, means for connecting said turbine member to said driven member, a fluid pressure source, fluid flow feed passage means for delivering hydrokinetic fluid from said source to said circuit, converter fluid return passage means extending from said circuit to a low pressure region, pilot valve means disposed in and partly defining said feed passage means and including a first valve member adapted to be held axially fast, a second valve member connected to said turbine member and registering with said first valve member, said valve members providing a fluid flow restriction in said feed passage means that establishes a back pressure that is related in magnitude to axial turbine thrust forces, and means for delivering said back pressure to pressure sensitive portions of said mechanism.

8. The combination set forth in claim 6 wherein said mechanism includes a spring means for biasing normally said second valve member to a fluid flow restricting position, said valve means thereby being functional regardless of the direction of torque delivery through said mechanism.

9. The combination as set forth in claim 7 wherein said mechanism includes a spring means for biasing normally said second valve member to a fluid flow restricting position, said valve means thereby being functional regardless of the direction of torque delivery through said mechanism.

10. In an automatic power transmission mechanism having a hydrokinetic torque converter and a control valve system, said torque converter comprising an impeller member, a turbine member and a stator member situated in toroidal fluid flow relationship in a common torus circuit, said impeller member being adapted to be connected to an engine, said turbine member being adapted to be connected to a driven member, a fluid pressure source, converter flow passage means for delivering fluid from said source through said converter including a flow return passage for returning fluid flow from said converter to a low pressure region, pilot valve means disposed in fluid communication with said converter flow passage means including relatively movable valve parts respectively disposed in force transmitting relation with respect to separate members of said torque converter, said valve parts being subjected to axial thrust forces acting upon at least one of said separate members to vary the degree of restriction to fluid flow in said flow passage means as the axial thrust forces acting upon said one of said members change, thereby creating an axial thrust pressure signal that may be utilized by said control system to initiate control responses.

11. In a hydrokinetic power transmission mechanism for delivering power from an engine to a driven member, a bladed impeller member, a bladed turbine member and a bladed stator member situated in toroidal fluid flow relationship in a common torus circiut, said impeller member being adapted to be connected to said engine, means for connecting said turbine member to said driven member, a fluid pressure source, fluid flow passage means for delivering hydrokinetic fluid from said source through said circuit including a fluid return passage extending from said circuit to a low pressure region, pilot valve means disposed in fluid communication with said passage means and including a first valve member held axially fast, a second valve member disposed in registry with respect to said first valve member, means for mechanically transferring axial thrust forces from said stator member to said second valve member, thereby providing a fluid flow restriction in said passage means that establishes a flow variation therein that is related in magnitude to said axial thrust forces.

12. In a hydrokinetic power transmission mechanism for delivering power from an engine to a driven member, a bladed impeller member, a bladed turbine member and a bladed stator member situated in toroidal fluid flow relationship in a common torus circuit, said impeller member being adapted to be connected to said engine, means for connecting said turbine member to said driven member, a fluid pressure source, fluid flow passage means for delivering hydrokinetic fluid from said source through said circuit including a fluid return passage extending from said circuit to a low pressure region, pilot valve means disposed in fluid communication with said flow passage means and including a first valve member held axially fast, a second valve member disposed slidably with respect to said first valve member, means for mechanically transferring axial thrust forces from said stator member to said second valve member thereby providing a fluid flow restriction in said flow passage means that establishes a back pressure, means for delivering said back pressure to pressure sensitive control portions of said mechanism and means for transferring axial thrust forces acting upon said turbine member to said stator member, whereby said second valve member is shifted relative to said first valve member in response to the combined axial thrust forces of said turbine member and said stator member.

13. In a hydrokinetic power transmission mechanism for delivering power from an engine to a driven member, a bladed impeller member, a bladed turbine member and a bladed stator member situated in toroidal fluid flow relationship in a common torus circuit, said impeller member being adapted to be connected to said engine, means for connecting said turbine member to said driven member, a fluid pressure source, fluid flow passage means for delivering hydrokinetic fluid from said source through said circuit including a converter fluid return passage extending from said circuit to a low pressure region, pilot valve means for providing a fluid flow restriction in said flow passage means that establishes a back pressure that is related in magnitude to axial thrust forces acting on said stator member, means for delivering said back pressure to pressure sensitive portions of said mechanism, said pilot valve means comprising an annular cylinder situated between portions of said impeller member and said stator member, an orifice formed in said cylinder, an annular valve ring situated in said cylinder and cooperating therewith to define a pressure chamber, and means for transferring axial thrust forces from said stator member to said ring, said chamber being in fluid communication with said passage means, said ring restricting said orifice in response to an increase in the axial thrust forces acting upon said stator member.

14. In a hydrokinetic power transmission mechanism for delivering power from an engine to a driven member, a bladed impeller member, a bladed turbine member and a bladed stator member situated in toroidal fluid flow relationship in a common torus circuit, said impeller member being adapted to be connected to said engine, means for connecting said turbine member to said driven member, a fluid pressure source, fluid flow passage means for delivering hydrokinetic fluid from said source through said circuit including a converter fluid return passage extending from said circuit to a low pressure region, pilot valve means for providing a fluid flow restriction in said flow passage means that establishes a back pressure, means for delivering said back pressure to pressure sensitive portions of said mechanism, said pilot valve means comprising an annular cylinder situated between portions of said impeller member and said stator member, an orifice formed in said cylinder member, an annular valve ring situated in said cylinder and cooperating therewith to define a pressure chamber, means for transferring axial thrust forces from said stator member to said ring, said chamber being in fluid communication with said flow passage means, said ring restricting said orifice in response to an increase in the thrust forces acting upon said stator member, and means for transferring axial thrust forces acting upon said turbine member to said stator member, whereby said ring is shifted relative to cylinder in response to the combined axial thrust forces of said turbine member and said stator member.

15. In a hydrokinetic power transmission mechanism for delivering power from an engine to a driven member, a bladed impeller member, a bladed turbine member and a bladed stator member situated in toroidal fluid flow relationship in a common torus circuit, said impeller member being adapted to be connected to said engine, means for connecting said turbine member to said driven member, a fluid pressure source, fluid flow passage means for delivering hydrokinetic fluid from said source through said circuit including a converter fluid return passage extending from said circuit to a low pressure region, pilot valve means disposed in fluid communication with said passage means and including a first valve member, means for holding said first valve member axially fast, a second valve member disposed in registry with respect to said first valve member, means for mechanically transferring axial thrust forces from said turbine member to said second valve member, thereby providing a fluid flow restriction in said flow passage means that establishes a back pressure that is related in magnitude to said axial thrust forces, and means for delivering said back pressure to pressure sensitive portions of said mechanism.

16. In a hydrokinetic power transmission mechanism for delivering power from an engine to a driven member, a bladed impeller member, a bladed turbine member and a bladed stator member situated in toroidal fluid flow relationship in a common torus circuit, said impeller member being adapted to be connected to said engine, means for connecting said turbine member to said driven member, a fluid pressure source, fluid flow passage means for delivering hydrokinetic fluid from said source through said circuit, converter fluid return passage means extending from said circuit to a low pressure region, pilot valve means disposed in and partly defining said feed passage means and including a first valve member, means for holding said first valve member axially fast, a second valve member connected to said turbine member and adapted to register with said first valve member, said valve members providing a fluid flow restriction in said flow passage means that establishes a back pressure that is related in magnitude to axial turbine thrust forces, and means for delivering said back pressure to pressure sensitive portions of said mechanism.

References Cited by the Examiner
UNITED STATES PATENTS

| | | | |
|---|---|---|---|
| 2,337,748 | 12/43 | Gsching | 60—54 X |
| 2,416,129 | 2/47 | Swift | 60—54 |
| 2,580,072 | 12/51 | Burnett | 60—54 |

JULIUS E. WEST, *Primary Examiner.*